United States Patent [19]

Terasawa

[11] Patent Number: 4,728,970

[45] Date of Patent: Mar. 1, 1988

[54] SUCTION RECOVERY APPARATUS OF INK-JET PRINTER

[75] Inventor: Koji Terasawa, Mitaka, Japan

[73] Assignee: Canon Kabushiki Kaisha, Tokyo, Japan

[21] Appl. No.: 909,934

[22] Filed: Sep. 22, 1986

Related U.S. Application Data

[63] Continuation of Ser. No. 797,482, Nov. 13, 1985, abandoned.

[30] Foreign Application Priority Data

Nov. 14, 1984 [JP] Japan ................................ 59-240323

[51] Int. Cl.[4] ............................................ G01D 15/18

[52] U.S. Cl. ................................................ 346/140 R

[58] Field of Search ......................................... 346/140

[56] References Cited

U.S. PATENT DOCUMENTS

| | | | |
|---|---|---|---|
| 4,045,802 | 8/1977 | Fukazawa | 346/140 |
| 4,506,277 | 3/1985 | Terasawa | 346/140 |
| 4,551,735 | 11/1985 | Suzuki | 346/140 |
| 4,631,556 | 12/1986 | Watanabe | 346/140 |

*Primary Examiner*—Joseph W. Hartary

*Attorney, Agent, or Firm*—Fitzpatrick, Cella, Harper & Scinto

[57] ABSTRACT

An apparatus for recovering the discharge function of an ink-jet printer by suction comprises a plurality of cap members facing fluid discharge recording means each for ejecting an ink onto a recording surface of a recording medium so as to record an image, wherein each of the cap members comprises a cap slider disposed in a cap holder to be movable in a back-and-forth direction and having a rear end portion provided with a stopper member which can abut against a rear end face of the cap holder; a rubber member disposed in a front opening portion of the cap slider and having an inner portion which can be coupled to the fluid discharge recording means; and a spring member interposed between the cap holder and the cap slider and compressed when the rubber member is depressed backward.

5 Claims, 5 Drawing Figures

SUCTION RECOVERY APPARATUS OF INK-JET PRINTER

This is a continuation of application Ser. No. 797,482, filed Nov. 13, 1985 now abandoned.

BACKGROUND OF THE INVENTION

1. Field of the Invention

The present invention relates to apparatus for recovering the discharge function of an ink-jet printer by suction referred to as a suction recovery apparatus) and, more particularly, to a multicolor printer suction recovery apparatus for drawing an ink from a nozzle portion for ejecting an ink so as to remove air bubbles therefrom and prevent clogging.

2. Description of the Prior Art

A conventional ink-jet printer has a carriage movable in a given direction along a recording surface. A plurality of fluid ejection recording units are mounted on the carriage so as to perform image recording. In a multicolor ink-jet printer of this type, when air bubbles are formed in the fluid discharge recording unit or when a nozzle portion thereof is clogged, the carriage is set at a predetermined position, e.g., a home position, which does not oppose the recording surface. A suction recovery apparatus disposed at the home position draws ink by suction from the nozzle portion, thereby removing air bubbles and preventing clogging.

In such a multicolor ink-jet printer, when ink suction is performed, the suction recovery apparatus must be reliably coupled to the fluid discharge recording units. However, in the conventional suction recovery apparatus, a plurality of cap members are integrally moved toward the nozzle portions of the fluid discharge recording units. Therefore, when the horizontal positional relationship of the cap holder, the carriage, and the like is undesirably shifted, the plurality of cap members cannot be firmly coupled to the corresponding fluid discharge recording units. For this reason, the cap holder, the carriage, and the like must be aligned so as to firmly couple the cap members to the fluid discharge recording units, resulting in cumbersome adjustment.

SUMMARY OF THE INVENTION

The present invention has been made in consideration of the above problems, and has as its object to provide a suction recovery apparatus for a multicolor ink-jet printer which can achieve reliable coupling between cap members and fluid discharge recording units by a simple adjusting operation, even if the horizontal positional relationship of, e.g., a cap holder, a carriage, and the like is shifted.

It is another object of the present invention to provide a suction recovery apparatus for an ink-jet printer which comprises a plurality of cap members facing at a predetermined position fluid discharge recording means each for ejecting an ink of a different color onto a recording surface of a recording medium so as to record an image, wherein each of the cap members comprises a cap slider disposed in a cap holder to be movable in a back-and-forth direction and having a rear end portion provided with a stopper member which can abut against a rear end face of the cap holder; a rubber member disposed in a front opening portion of each cap slider and storing a suction member therein which can be coupled to the corresponding fluid ejection recording means; and a spring member interposed between the cap holder and each cap slider and compressed when the corresponding rubber member is depressed backward.

DETAILED DESCRIPTION OF THE PREFERRED EMBODIMENT

In order to achieve the above objects, a suction recovery apparatus of the present invention comprises a spring member which is compressed when a rubber member interposed between a cap holder and each cap slider and disposed in a front end opening portion of the cap slider is pressed backward.

The present invention will be described in detail with reference to the accompanying drawings.

Figure 1:
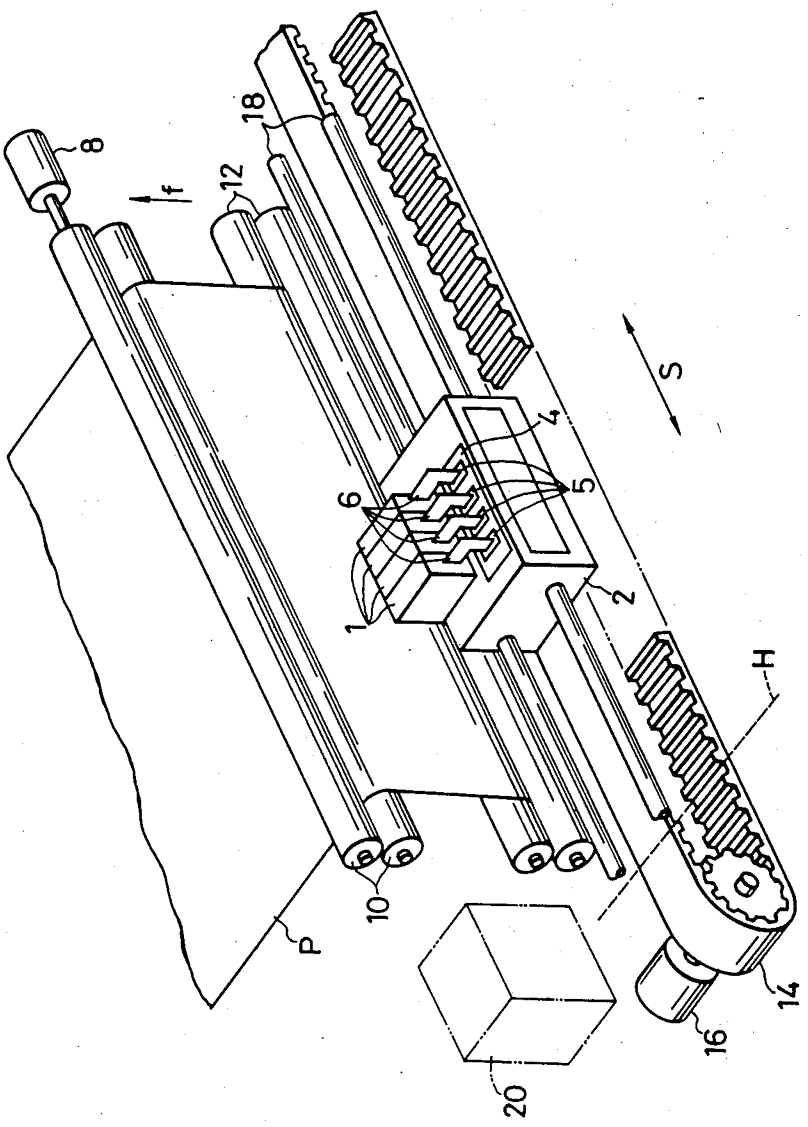
FIG. 1 is a perspective view showing an example of a multicolor ink-jet printer.

FIG. 1 shows an arrangement of a main part of an ink-jet printer to which the present invention can be applied. Fluid discharging recording units 1 are mounted on a carriage 2. Each unit 1 has an ink reservoir portion for storing an ink supplied from an ink supply source, and a recording head provided with a nozzle portion for discharging stored ink. In this embodiment, four units 1 correspond to four ink colors. As will be described later, a cartridge tank as the ink supply source can be mounted on the carriage 2. A printed circuit board 4 controls ink ejection by the units 1. A flexible cable 6 couples the printed circuit board 4 and the units 1 through a connector 5. A paper feed motor 8 is coupled to one of rollers 10, and drives the rollers 10 so as to feed a recording paper sheet P in a direction indicated by arrow f in FIG. 1. Rollers 12 together with the rollers 10 feed the sheet P to be flat, thereby forming a recording surface with respect to the units 1.

A carriage driving belt 14 has the carriage 2 fixed thereon, and is driven by a motor 16 in a direction indicated by arrow S. The carriage 2 is moved along guide rails 18 by the motor 16 in the direction indicated by arrow S so as to record on the recording surface.

A multicolor suction recovery apparatus 20 faces the units 1 at a home position H of the units 1 so as to perform suction.

Figure 2:
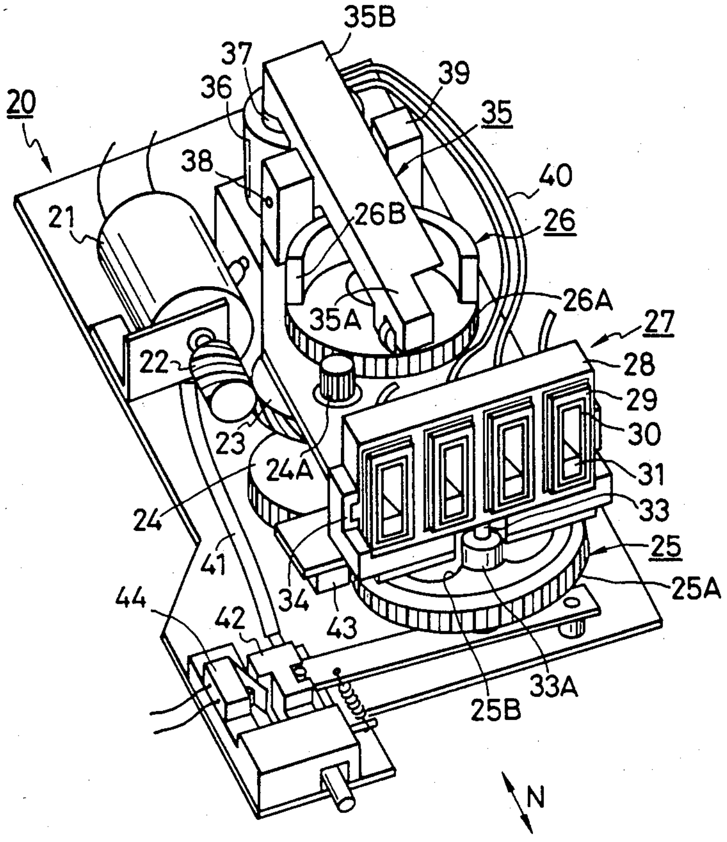
FIG. 2 is a perspective view showing an example of a suction recovery apparatus in the ink-jet printer shown in FIG. 1.
Figure 3:
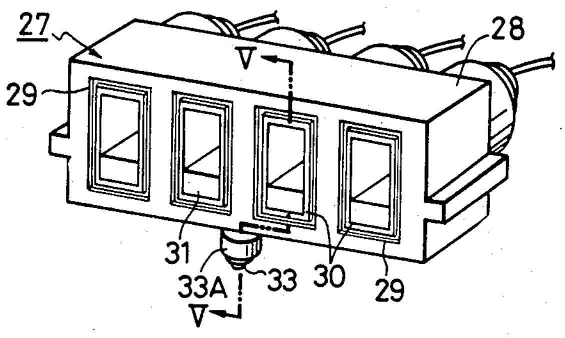
FIG. 3 is an enlarged perspective view showing a part of the suction recovery apparatus shown in FIG. 2.

FIG. 2 shows an arrangement of the multicolor suction recovery apparatus 20. A motor 21 is used as a driving source of the suction recovery apparatus. Rotation of the motor 21 is transmitted to a gear surface 25A of a cam 25 through a gear array constituted by gears 22, 23 and 24, and is further transmitted to a gear surface 26A of a cam 26 through another gear array constituted by gears 22, 23 and 24A.

Cam surfaces 25B and 26B having predetermined curved surfaces with predetermined shapes are formed in the cams 25 and 26, respectively.

Figure 4:
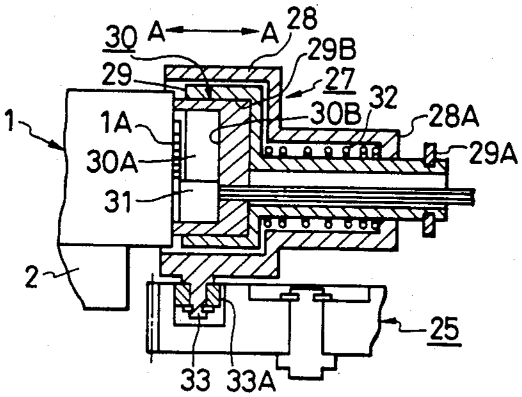
FIG. 4 is a sectional view for explaining an operation of the suction recovery apparatus.
Figure 5:
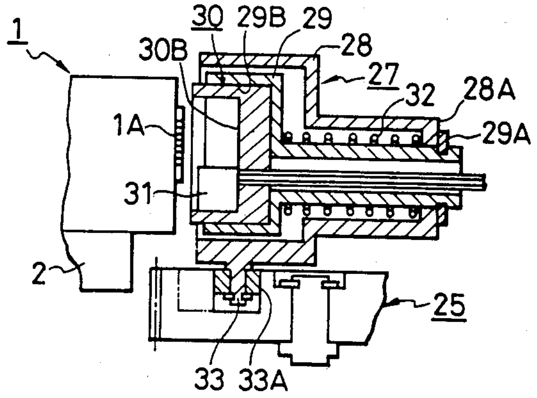
FIG. 5 is a sectional view taken along a line V—V of FIG. 3.

A cap 27 faces the units 1 when the carriage 2 is set at the home position H. As shown in FIGS. 4 and 5, the cap 27 comprises a cap holder 28; cap sliders or members 29 each of which comprise a movable portion disposed in the cap holder 28 to be movable in a back-and-forth direction (indicated by arrow A—A) and is provided with a stopper ring 29A at its rear end portion, which abuts against a rear end face 28A of the cap holder 28 so as to restrict forward movement of the cap slider 29; a rubber member 30, disposed in a front end opening portion 29B of each cap slider 29, for air-tight sealing of an inner space 30A defined by the units 1 and itself in a state coupled with the corresponding unit 1 (in a state shown in FIG. 4); a suction member 31 stored in a lower portion of each rubber member 30 and made of a water-absorbing porous material coupled to a corresponding nozzle member lA; and a compression spring 32 interposed between the cap holder 28 and each cap slider 29 and compressed according to a compression force when the corresponding rubber member 30 is depressed backward. In this manner, the cap slider 29 and the rubber member 30 are movable relative to the cap holder 28, and a shift in horizontal positional relationship of the cap holder 28, the carriage 2, and the like is absorbed by the compression amount of the compression spring 3. Thus, in accordance with the main feature of the present invention, when the suction operation is performed, the cap 27 can be firmly coupled to the units 1. Note that FIG. 5 shows a state wherein a couping state between the cap 27 and the fluid discharge recording units 1 is released, i.e., a cap release state. In this state, the carriage 2 can be moved.

The cap 27 is provided with a shaft 33 having a roller 33A brought into contact with the cam surface 25B at a position facing the nozzle portion lA. When the roller 33A is arranged to come into continuous contact with the cam surface 25B by a spring member (not shown) biased toward the cam surface 25B, a deviation in the cam surface 25B can be reliably transmitted to the cap 27, and the cap member 27 can be moved along a guide 34 in a direction indicated by arrow N in FIG. 2.

A lever 35 has an edge portion 35A provided with a roller slidably contacting the cam surface 26B, and an edge portion 35B for driving a piston 37 of a pump 36. The lever 35 is axially supported by a pin 38 of a supporting member 39 at the edge portions 35A and 35B so as to be pivotal about the pin 38. A spring for pushing up the piston 37 is installed in the pump 36. The lever 35 can be provided with a spring biased in a direction in which the edge portion 35A abuts against the cam surface 26B. That is, upon rotation of the cam 26, the lever 35 pivots about the pin 38 so as to reciprocate the piston 37, thereby driving the pump 36.

The pump 36 is connected to the cap 27 through suction tubes 40. When the pump 36 is driven, ink is drawn by suction from the nozzle portion 1A through the suction member 31, and is guided to the pump 36 through the suction tube 40.

Although the suction member 31 need not always be provided, it is preferably provided to prevent leakage of ink. The number of the suction members 31 and the suction tubes 40 varies according to the number of ink colors. When four colors of inks are used as in this embodiment, four suction members 31 and four suction tubes 40 are provided to have one-to-one correspondence to colors of inks. Thus, even when multicolor inks are mixed in the pump 36, since the suction tubes 40 are sealed in the pump 36, the nozzle portions lA do not receive any mixed ink.

The mixed ink drawn by the pump 36 by suction can be exhausted through an ink exhaust pipe 41 connection to the pump 36.

Furthermore, when the suction operation is performed, in order to provide firm connection between the suction recovery apparatus 20 and the units 1, a lock mechanism for coupling the carriage 2 to the suction recovery apparatus 20 is provided. That is, a lock member 42 is provided to be movable in the direction indicated by arrow N so as to fix the carriage 2 when the carriage 2 is positioned at the home position H.

Referring to FIG. 2, microswitches 43 and 44 detect positions of the cap 27 and the lock member 42, and open/close signals can be used for control of the motor 21, e.g., cap processing for transportation of an ink-jet printer.

As described above, according to the present invention, a suction recovery apparatus comprises a spring member interposed between a cap holder and a cap slider and compressed when a rubber member is depressed backward. In a multicolor ink-jet printer, even if the horizontal positional relationship of the cap holder, the carriage, and the like is shifted, it can be absorbed by compression of the spring member. Therefore, when a suction operation is performed, the cap members can be firmly coupled to fluid ejection recording units by a simple adjusting operation.

What is claimed is:

1. An apparatus for recovering by suction the discharge function of an ink-jet printer having a plurality of fluid discharge recording means for ejecting ink onto a recording medium, which apparatus comprises a plurality of cap members, each of which corresponds to one of said fluid discharge recording means, wherein each of said cap members comprises a movable portion disposed in a cap holder to be movable in a back-and-forth direction and having a rear end portion provided with a stopper member which can abut against a rear end face of said cap holder; a rubber member disposed in a front opening portion of said movable portion and having an inner portion which can be coupled to said fluid discharge recording means; and a spring member inteposed between said cap holder said movable portion and compressed when said rubber member is depressed backward.

2. An apparatus according to claim 1, wherien said rubber member stores suction member for drawing an ink by suction.

3. An apparatus according to claim 1, wherein said movable portion includes a cap slider.

4. An ink-jet printer comprising:

a plurality of fluid discharge recording means for ejecting an ink onto a recording surface of a recording medium so as to record and image;

driving means for driving said fluid discharge recording means; and means for recorving the discharge function of the ink-jet printer by suction, which comprises a plurality of cap members, each said cap member corresponding to one of said fluid discharge recording menas, wherein each of said cap members comprises a cap slider disposed in a cap holder to be movable in a back-and-forth direction and having a rear end portion provided with a stopped member which can abut against a rear end face of said cap holder; a rubber member disposed in a front opening portion of said cap slider and having an inner portion which can be coupled to said fluid discharge recording means; and a spring member interposed between said cap holder and said cap slider and compressed when said rubber member is depressed backward.

5. A printer according to claim 4, wherein a plurality of said fluid discharge recording means are provided therein and different inks are introduced into respective said fluid discharge recording means.

* * * * *

UNITED STATES PATENT AND TRADEMARK OFFICE
CERTIFICATE OF CORRECTION

PATENT NO. : 4,728,970

DATED : March 1, 1988

INVENTOR(S) : KOJI TERASAWA

It is certified that error appears in the above-identified patent and that said Letters Patent is hereby corrected as shown below:

COLUMN 1

Line 12, "referred" should read --(referred--.

COLUMN 2

Line 61, "predetermined" should be deleted.
Line 67, "comprise" should read --comprises--.

COLUMN 3

Line 23, "couping" should read --coupling--.
Line 33, "member" should be deleted.
Line 50, "tube" should read --tubes--.
Line 63, "connection" should read --connected--.

UNITED STATES PATENT AND TRADEMARK OFFICE
CERTIFICATE OF CORRECTION

PATENT NO. : 4,728,970

DATED : March 1, 1988

INVENTOR(S) : KOJI TERASAWA

It is certified that error appears in the above-identified patent and that said Letters Patent is hereby corrected as shown below:

COLUMN 4

Line 35, "holder said" should read --holder and said--.
Line 38, "wherien" should read --wherein--.
Line 39, "suction" should read --a suction--.
Line 45, "and" should read --an--.
Line 48, "recorving" should read --recovering--.
Line 52, "menas," should read --means,--.
Line 55, "stopped" should read --stopper--.

Signed and Sealed this

Twenty-seventh Day of September, 1988

*Attest:*

DONALD J. QUIGG

*Attesting Officer* *Commissioner of Patents and Trademarks*